United States Patent [19]

Adams et al.

[11] Patent Number: 5,116,969

[45] Date of Patent: May 26, 1992

[54] ULTRAREFINED ARABINOGALACTAN PRODUCT

[75] Inventors: Mark F. Adams; Melvin R. Knudson, both of Tacoma, Wash.

[73] Assignee: Larex International, Inc., Tacoma, Wash.

[21] Appl. No.: 514,961

[22] Filed: Apr. 26, 1990

[51] Int. Cl.$^5$ .......................... C07H 1/00; C08B 37/00
[52] U.S. Cl. .................................. 536/128; 536/127; 536/124; 536/1.1; 536/103; 530/507; 530/500
[58] Field of Search ............... 536/1.1, 124, 128, 127, 536/183; 530/500, 507

[56] References Cited

U.S. PATENT DOCUMENTS

| | | | |
|---|---|---|---|
| 3,325,473 | 6/1967 | Herrick et al. | 536/127 |
| 3,337,526 | 8/1967 | Adams | 536/128 |
| 4,950,751 | 8/1990 | DeWitt | 536/1.1 |

OTHER PUBLICATIONS

Adams, Mark F. and Bruce V. Ettling, Larch Arabinogalactan, In *Industrial Gums*, R. L. Whistler and J. N. BeMiller, Eds., Academic Press, New York (1973).

Corash, Laurence M., Density Dependent Red Cell Separation, In *Red Cell Metabolism*, Ernest Beutler, Ed., Churchill Livingstone, New York (1986).

Corash, L. M., S. Piomelli, H. C. Chen, C. Seaman, and E. Gross, Separation of Erythrocytes According to Age on a Simplified Density *Gradient, Jour. of Laboratory and Clinical Medicine*, 84 (1): 147–151 (1974).

Primary Examiner—Ronald W. Griffin
Assistant Examiner—Louise N. Leary
Attorney, Agent, or Firm—Keith D. Gehr

[57] ABSTRACT

The invention is a very highly refined arabinogalactan gum falling within the molecular weight range of 6,000–2,500,000 and having a tannic acid equivalent of less than about 0.5 mg/g. The preferred product will have a molecular weight within the range of 6,000–1,300,000 and tannic acid equivalent no higher than about 0.25. The product is nearly colorless and is tasteless and odorless. it is prepared by first making a crude water extract of a natural source such as larch wood. This extract is next refined by the addition of an active MgO to precipitate the bulk of the lignans and iron containing compounds. Following that it is processed through a membrane no larger than about 0.45 μm to remove any species having molecular weights in excess of about 2,500,000. The permeate may then be treated on successively smaller membranes down to about 6,000 daltons. The permeate through the 6,000 dalton membrane contains virtually all of the monomers, homopolymers, and other materials that would contribute to the osmolality of a resulting solution of the ultrarefined arabinogalactan. The product is especially useful for medical research involving cell separation by density gradient since its contribution to the osmolality of a solution is essentially zero.

11 Claims, No Drawings

ULTRAREFINED ARABINOGALACTAN PRODUCT

BACKGROUND OF THE INVENTION

The present invention relates to an ultrarefined arabinogalactan polysaccharide gum of a defined molecular weight range and to the method for its preparation. The invention is particularly concerned with an arabinogalactan polysaccharide material with a molecular weight distribution within about 6,000 and 2,500,000 which makes essentially no contribution to the osmolality of aqueous solutions in which it is a solute.

Partially refined arabinogalactan gums have been available commercially for a number of years. This polysaccharide occurs widely in many plant and bacteria species. It is found in significant quantities in the trees of the genus Larix, particularly in the lower portion of *Larix occidentalis* Nuttall (western larch). The characterization, production, and uses of larch arabinogalactan gums is discussed by M. F. Adams and B. V. Ettling in *Industrial Gums*, 2 ed., R. L. Whistler and J. N. BeMiller Eds., pp 415–427, Academic Press, New York (1973). In some old growth trees the arabinogalactan is present in the butt log in such great quantities as cause ring shake (circular splits) and render the log much less valuable for lumber manufacture. This same wood, when comminuted, provides a ready source of arabinogalactan when extracted with warm water. Extraction is normally carried out in countercurrent manner with water at a temperature below about 70° C., as is described in U.S. Pat. No. 3,337,526 to Adams.

Arabinogalactan is a polymer of arabinose and galactose in varying ratios which are combined to form molecules with a general ball-like configuration. There is a wide range of molecular sizes varying from monomolecular and low molecular weight homopolymers to macromolecules with molecular weights well over 2,500,000. Molecular weight distribution tends to be bimodal with peaks at about 50,000 and 90,000.

A number of other chemical species, normally considered undesirable, are also extracted along with the arabinogalactan. These include especially the tannin-like lignans, aromadendrins, other simple and complex hydroxyaromatic compounds, and terpenes. At least some of these compounds appear to be hydrogen bonded to the arabinogalactan. As a first step in refining, heat treatment alone, such as by spray or drum drying the crude extract, will serve to partially break these hydrogen bonds. Another method of breaking the hydrogen bonds is by digestion of an aqueous solution in the presence of a polar compound such as methanol. A preferred method of refining is by treatment with an active form of MgO at pH 9–10 by digestion at elevated temperature, as taught in U.S. Pat. No. 3,325,473 to Herrick et al. This causes the phenolic and iron containing compounds to precipitate, leaving a clear yellow solution of arabinogalactan. A product made by this method is available as Stractan 2, from Champion International Corp., Libby, Mo. Despite the aforenoted refining, the presence of residual color indicates that not all of the phenolic materials are removed. This is confirmed by measurement of ultraviolet transmission characteristics and tannic acid equivalent.

One procedure for obtaining a more highly refined arabinogalactan has been published by L. Corash in *Red Cell Metabolism*, E. Beuttler, ed. Vol. 16, Chap. 8, pp 99–106, Churchill Livingstone, London (1986). Here the MgO treated arabinogalactan referred to above is further refined by sequential treatment first with a cation then an anion exchange resin. This procedure is slow and cumbersome but has been used to produce a fairly pure arabinogalactan in small quantities sufficient for research purposes.

An important use of the more highly refined arabinogalactan, such as that described by Corash, is as a component of solutions for density gradient separation of biological materials such as blood cells, viruses, and organelles. These solutions must in general be isotonic and physiologically harmless to the material being separated. One such procedure using arabinogalactan was described by Corash et al. in the following article: Separation of erythrocytes according to age on a simplified density gradient. *Journal of Laboratory and Clinical Medicine*, 84 (1): 147–151 (1974).

While the material purified by the Corash procedure has been very useful, it has not been completely satisfactory since it still has appreciable color, taste and odor. It has now been discovered that this is due to the appreciable amount of retained low molecular weight species of arabinogalactan and other materials. In addition to the aforenoted deficiencies, the Corash product still contributes significantly to the osmolality of resulting solutions. The most desirable product would have little or none of the potentially toxic aromatics and make little or no contribution to solution osmolality. Stated differently, the arabinogalactan could be used for its independent contribution to solution density without introducing interacting factors, such as osmolality upsets, that required compensation. Up to the present time no such product has existed.

SUMMARY OF THE INVENTION

The present invention comprises a highly refined arabinogalactan polymer having a molecular weight falling generally within the range between about 6,000 and 2,500,000 and further having a tannic acid equivalent no greater than about 0.5 mg/g. A preferred compound falls within the molecular weight range between about 6,000 and 1,500,000 and has a tannic acid equivalent no greater than about 0.25 mg/g. Any narrower molecular weight range within these limits may also be chosen for its special properties; e.g., 20,000–50,000, 50,000–100,000, etc.

Defined somewhat differently, the product lies within a molecular weight range that will completely pass through or permeate a 0.45 μm pore size membrane and be wholly retained on a 6,000 dalton membrane while having a maximum tannic acid equivalent of no greater than about 0.5 mg/g. Preferably the product will all pass through a 0.2 μm membrane and most preferably a 0.1 μm membrane and have a tannic acid equivalent no higher than about 0.25 mg/g.

The polymers thus characterized will make a negligible contribution to the osmolality of any solution of which they are all or a portion of the solute in concentrations up to about 50% by weight. Surprisingly, it has been discovered that the monomers, homopolymers, and non-carbohydrate materials having a molecular weight of less than about 6000 make virtually all of the contribution to the osmolality of a solution of an arabinogalactan product.

The product is preferably prepared by first treating a crude extract of arabinogalactan with an active form of MgO to precipitate lignans, other o-hydroxyaromatic phenols, and any iron-containing compounds. This partially refined composition is then filtered through a membrane having a pore size no larger than about 0.45 $\mu$m, preferably about 0.2 $\mu$m and most preferably about 0.1 $\mu$m, to remove any particulate foreign matter and especially polymers having a molecular weight in excess of about 2,500,000. The smaller pore size membranes just noted will also remove other materials such as bacteria and colloidal particles. This first membrane, of whichever of the above noted sizes is used, will also remove most of the free and hydrogen bonded lignans remaining after the initial MgO refining step. Finally any monomers, homopolymers, and other materials that will pass through a 6,000 dalton membrane are removed to leave a product of very low color that is essentially odorless, and tasteless.

The low molecular weight fraction passing a 6000 dalton membrane is itself useful for many applications including those that take advantage of its surface active properties.

It is an object of the invention to provide a highly refined arabinogalactan polymer having a molecular weight distribution falling between 6,000 and 2,500,000.

It is another object to provide an arabinogalactan polymer that is essentially colorless, odorless, and tasteless.

It is a further object to provide an arabinogalactan polymer that makes essentially no osmotic contribution to any solution in which it is a solute.

It is yet an object to provide a very highly refined arabinogalactan polymer that is carefully defined as to molecular weight range.

These and many other objects will become readily apparent upon reading the following detailed description.

DETAILED DESCRIPTION OF THE PREFERRED EMBODIMENTS

The present invention is a highly refined arabinogalactan product, or series of products, each having a controlled molecular weight distribution. The products are especially useful in various fields of medical and veterinary research, bacteriology, virology, plant physiology, and others. A common feature of all of the products is the essential absence of low end components under a molecular weight of about 6,000. The products preferred for some uses may have essentially all of the low end fractions under a molecular weight of about 20,000 removed. This absence of low molecular weight fractions virtually eliminates any contribution of the refined arabinogalactan to the osmolality of any solution of which it forms a part of or the entire solute. In addition, the components that contribute to taste and odor are predominantly found in the fraction having a molecular weight under about 6000.

The units of osmolality are usually expressed as millimoles per kilogram of water (mM/kg $H_2O$) or as milliosmols per kilogram of water (mOsm/kg $H_2O$), where an osmol is the molecular weight divided by the number of molecular particles or ions formed when the compound dissociates. For a nondissociating compound an osmol is the same as the molecular weight. For a given compound in solution, at a given temperature, the ratio of osmotic potential in (mOsm/kg $H_2O$) divided by the solute concentration (in grams solute per kilogram solvent) is essentially a constant having the units of milliosmols/gram. This constant serves as a means for predicting the contribution of any given amount of a compound to the osmolality of a solution of the compound.

The availability within the past 20 years of membranes having, in essence, a range of controlled size pores of molecular diameter has given rise to the processes of microfiltration and ultrafiltration. Microfiltration is generally defined to encompass a pore size range from about 0.25 $\mu$m down to 0.05 $\mu$m. Ultrafiltration extends this range down to pore sizes as low as about 0.005 $\mu$m. For the purposes of the present application the term "ultrafiltration" will be considered to encompass the entire range just noted. Suspended or dissolved solids can be segregated by the membrane on the basis of their physical diameter or molecular size. As one example, a membrane of very small pore size can be used to recover fresh water from brines. At the upper end of the pore size spectrum, the membranes are frequently used for so-called filter sterilization of heat labile or other materials by separation of bacteria or other pathogens from various liquids. Ultrafiltration can also serve as a convenient and relatively inexpensive method for separation of polymeric materials having a wide distribution of molecular weights into products having narrow and controlled molecular weight ranges.

One example noted earlier described the use of arabinogalactan solutions as a density gradient material for medical research; e.g., separation of red blood cells by age. The density gradient solutions must be able to provide a range of densities near that of blood plasma and be essentially isotonic; i.e., have an osmotic potential essentially the same as the cells being separated. It is preferred that the material used to control solution density not interact in any manner with other necessary components of the solution. As one example, the density gradient material should have little or no effect on osmolality regardless of its concentration. This requires a contribution to solution osmolality, expressed as described before in mOsm/g, of zero or very nearly so. To achieve such osmotic properties in a polymer such as arabinogalactan, it has now been discovered that the low end monomers, homopolymers, and any other materials up to a molecular weight of at least about 6,000 must be removed. This has not been done before by any of the processes used to this date and arabinogalactan lacking these low end molecules must be regarded as a new composition of matter.

The earlier noted U.S. Pat. No. 3,325,473 to Herrick et al. describes a method of partially refining a crude arabinogalactan extract by digestion at elevated temperature with an active MgO. This patent is herein incorporated by reference. Briefly, about 3 parts of a fluffy MgO was added to a solution of about 15-18% concentration of crude arabinogalactan extract. The solution was heated to near boiling for from 7-10 minutes or until a flocculent precipitate became gelatinous in appearance. At that time heating was discontinued and a water slurry containing 0.4 parts of MgO added. The entire mixture was then filtered.

It was noted that the product refined by the method had 90% less phenolic substances and 98% less iron containing materials than the unrefined product. Phenolic substances were determined by performing the Folin-Denis test for tannic acid equivalent (TAE), which test is described in detail in the patent. Greater detail of this test, including preparation of Folin-Denis reagent, is found in Snell, F. D. and C. T. Snell, *Colorimetric Methods of Analysis*, 3 ed., Vol. 3, p 116, Van Nostrand, New York (1953). In this test, 2 mL of a 1% solution of the arabinogalactan is placed in a 100 mL volumetric flask along with 2.5 mL of Folin-Denis reagent and 13 mL of a 20% Na$_2$CO$_3$ solution. The solution is made to volume with water and allowed to stand for 30 minutes. Absorbency at 730 mµ is read and compared with a standard curve based on tannic acid. The noted absorbency can then be converted to milligrams of tannic acid per gram of sample tested.

Osmolality of all samples was measured using an Advance Model 3D2 freezing point depression osmometer. This is available from Advanced Instruments, Inc. Needham Heights, Mass.

In the initial procedure of the present invention an arabinogalactan solution, refined by the MgO procedure described above, was first filtered through a membrane no larger than about 0.45 µm to remove foreign particles and any bacteria or colloidal matter as well as polymer molecules having a molecular weight greater than about 2,500,000. This step will significantly reduce the tannic acid equivalent of the product. Further refining is accomplished by filtering through ultrafiltration membranes of increasingly smaller pore size. Details of the procedures are given in the following examples.

While the correlation between membrane pore size and molecular weight is not perfect, tables have been published that enable reasonably close estimation of the molecular weights of various polymeric materials. Over the range considered the relationship is generally of the log-log type. At the low end a pore size of 0.002 µm will pass molecules with a molecular weight of about 10,000. In the midrange, a pore size of 0.01 µm will pass molecules with molecular weights in the range of about 100,000 to 200,000. At the upper end, with macromolecules having a molecular weight range of over about 1,000,000, the correlation of molecular weight with pore size is not as good but is useful for making estimates. A pore size of 0.1 µm will pass molecules in the range of about 1,000,000 to 1,300,000 molecular weight. Membranes are manufactured with pore size ratings in either or both of pore diameter or molecular weight (daltons) passed. For the compositions of matter of the present invention, a pore size of 0.45 µm appears to pass a polymer with a molecular weight of about 2,500,000. The majority of the color bodies remaining after the MgO refining treatment are retained on this membrane. This indicates either that they are very large molecules in their own right or they still remain hydrogen bonded to large arabinogalactan molecules.

EXAMPLE 1

A solution of MgO refined arabinogalactan, preliminarily purified through a 0.1 µm membrane as described above, in any concentration from 0.1% to 70% by weight, preferably about 10%, is added to a stirred cell ultrafiltration unit. One unit that has been found satisfactory for laboratory use is supplied by Cole-Parmer Instruments Co., Chicago, Ill., as their Catalog No. J-2910-42. This unit has a 76 mm diameter membrane. This is not intended as an endorsement of this particular ultrafilter and those from other suppliers would be equally useful.

The filtration cell was equipped with a 6,000 dalton (molecular weight) membrane, the magnetic stirrer started, and the cell pressurized to 480 kPa (70 psi). The process was continued until about 75% of the volume of the solution in the cell has been collected as permeate. The pressure was released, the filtration cell opened, and a volume of deionized water equivalent to the volume of retentate was added to the filtration cell. The cell was again closed and repressurized until 50% of the volume in the cell had permeated. This process is repeated 4 or 5 times or until the osmolality of the retentate is reduced to essentially zero mOsm/kg. The retentate was finally processed through a spray drier. This product has a molecular weight distribution between about 6,000 and 1,300,000.

For purposes of making the zero osmolality product the permeate containing the low molecular weight species can be discarded. However, this material is useful in its own right for other applications.

EXAMPLE 2

A solution of the controlled molecular weight product of Example 1 was placed in the ultrafiltration cell equipped with a 100,000 dalton membrane and processed as was just described. The retentate product is an arabinogalactan having a molecular weight distribution between about 100,000 and 1,300,000. The permeate from the above separation is similarly successively fractionated using membranes of 50,000 and 20,000 dalton pore sizes to give products having molecular weight distributions in the 50,000-100,000 and 20,000-50,000 molecular weight ranges respectively. The final permeate, which may be discarded, will contain arabinogalactan in the 6,000-20,000 molecular weight range.

EXAMPLE 3

The process of Example 1 was carried out using a 20,000 dalton membrane instead of the original 6,000 dalton membrane. The retentate contains arabinogalactan having a molecular weight in the 20,000-1,300,000 range. This procedure is usually preferred to that of Example 1 since the 6,000-20,000 fraction normally contains very little arabinogalactan and it is frequently more economical to discard it with the permeate rather than recover it. A 20% aqueous solution of the product of this example will have an osmolality at a level so low that it cannot be read on the freezing point osmometer.

The osmolality and tannic acid equivalent of a number of the arabinogalactan products described above is given in the following table.

TABLE 1

| Product | Osmolality. mOsm/g | Tannic Acid Equivalent, mg/g |
|---|---|---|
| MgO Purified | 0.763 | 1.50 |
| Corash | 0.182 | 0.27 |
| Example 3 | 0.00 | 0.20 |
| Below 6000 M.W. | >5 | — |

EXAMPLE 4

Osmolality was measured on the retentate and permeate of the material of Example 3 for each of 5 rinse steps. The material through the 0.1 µm membrane had an osmolality of 0.76 mOsm/g before further treatment using the 20,000 dalton membrane.

TABLE 2

| | Osmolality, mOsm/g | |
|---|---|---|
| Rinse No. | Retentate | Permeate |
| 1 | 0.35 | 4.3 |
| 2 | 0.14 | 5.8 |
| 3 | 0.076 | 6.0 |
| 4 | 0.00 | — |
| 5 | 0.00 | — |

The usefulness of the present process for producing an arabinogalactan product with essentially zero osmolality and reduced tannic acid equivalent is readily apparent from reference to the above table. The resulting product has very low color and is without taste or odor. In products known prior to those of the present invention, color has been an indication of significant presence of hydroxyaromatic compounds and taste and odor appeared to be associated with those species contributing to raised osmolality of resulting solutions.

The question might arise whether the preliminary MgO purification is necessary or whether simply spray or drum drying would suffice to break the hydrogen bonds between lignans and arabinogalactan prior to ultrafiltration. MgO purification does appear to be necessary. In the case of spray drying, product yields were very low. Using fresh extract without the MgO treatment resulted in a yield of 20,000–1,300,000 molecular weight product of only 16% of the original arabinogalactan. When the fresh extract was first drum dried the yield of this same fraction was only about 50% of the original arabinogalactan. In addition, color bodies were present in each of the ultrafiltration fractions. This compares with an approximate 68% yield of ultrapure arabinogalactan, based on fresh extract, using the MgO pretreatment. Yield based upon the MgO treated starting material is about 80%.

It should be noted that the order in which the various sizes of membranes are used is not critical. For example, the first ultrafiltration step could be on the 6,000 or 20,000 dalton membrane followed by filtration through a 0.1 μm membrane. However, the process is generally more efficient if the larger pore size membranes are used first.

While a product similar to the present one could potentially be prepared by other methods, such as ultracentrifuging or adsorption on molecular sieves, the present method appears to be the simplest and least costly.

It will be apparent to those skilled in the art that variations could be made in the process that would not affect the properties of the resulting products. These variations should be considered to be within the scope of the invention if they are encompassed within the following claims.

We claim:

1. A highly refined arabinogalactan polymer having a molecular weight within the range of about 6,000 to 2,500,000 and a tannic acid equivalent no greater than about 0.5 mg/g, said polymer further having the property of making negligible contribution to solution osmolality in solutions as high as 50% concentration by weight.

2. The product of claim 1 in which the molecular weight falls within the range of about 6,000 to 1,300,000 and the tannic acid equivalent is no greater than about 0.25 mg/g.

3. The product of claim 2 in which the molecular weight falls within the range of about 20,000 to 1,500,000.

4. A highly refined arabinogalactan polymer having a molecular weight range such that it will completely pass through a 0.45 μm ultrafiltration membrane and be wholly retained on a 6,000 dalton membrane, said polymer having a tannic acid equivalent no greater than about 0.5 mg/g.

5. The polymer of claim 4 which will entirely pass through a membrane having a pore diameter of about 0.2 μm.

6. The polymer of claim 4 which will completely pass through a membrane having a pore diameter of about 0.1 μm and which has a tannic acid equivalent no greater than about 0.25 mg/g.

7. The method of making a highly refined arabinogalactan polymer which comprises:

extracting a crude polymer from a natural source material with warm water;

treating said crude polymer by reaction with an active form of MgO in order to precipitate and remove a substantial amount of extracted aromatic and iron containing materials;

further refining said treated polymer by ultrafiltration through a membrane having pores no larger than about 0.45 μm and retaining the permeate in order to remove very high molecular weight materials including additional aromatic materials not removed by the MgO treatment; and then additionally refining the permeate by further ultrafiltration through a second membrane which removes materials below about 6000 daltons and retaining the retentate of said ultrafiltration, said second ultrafiltration removing virtually all low molecular weight monomers, homopolymers, and other materials which make significant contributions to solution osmolality.

8. The method of claim 7 in which the second ultrafiltration step removes materials below about 20,000 daltons.

9. The method of claim 7 in which the source material is the wood of *Larix occidentalis*.

10. The permeate through the second membrane as produced by the process of claim 7.

11. The permeate through the second membrane as produced by the process of claim 8.

* * * * *

REEXAMINATION CERTIFICATE (3167th)

United States Patent [19]
Adams et al.

[11] B1 5,116,969
[45] Certificate Issued Apr. 1, 1997

[54] ULTRAREFINED ARABINOGALACTAN PRODUCT

[75] Inventors: Mark F. Adams; Melvin R. Knudson, both of Tacoma, Wash.

[73] Assignee: Larex International, Inc., Duluth, Minn.

Reexamination Request:
No. 90/003,859, Jun. 5, 1995

Reexamination Certificate for:
Patent No.: 5,116,969
Issued: May 26, 1992
Appl. No.: 514,961
Filed: Apr. 26, 1990

[51] Int. Cl.⁶ .................... C07H 1/00; C08B 37/00
[52] U.S. Cl. .................... 536/128; 536/127; 536/124; 536/1.1; 536/103; 530/507; 530/500
[58] Field of Search .................... 536/128, 127, 536/124, 1.1, 103; 530/507, 500

[56] References Cited

U.S. PATENT DOCUMENTS

| | | | |
|---|---|---|---|
| 4,000,021 | 12/1976 | Voigt, Jr. | 149/20 |
| 4,039,662 | 8/1977 | Hecht et al. | 536/112 |
| 4,152,423 | 5/1979 | Adam et al. | 424/282.1 |
| 4,228,198 | 10/1980 | Burge et al. | 426/548 |
| 4,484,012 | 11/1984 | Stahl et al. | 568/863 |
| 4,489,114 | 12/1984 | Bridgeford | 428/34.8 |
| 4,508,745 | 4/1985 | Fulger et al. | 426/594 |
| 4,798,730 | 1/1989 | Scoville et al. | 426/432 |
| 4,818,751 | 4/1989 | Ibe | 514/54 |
| 4,822,622 | 4/1989 | Dokuzovic et al. | 426/5 |
| 4,994,285 | 2/1991 | Hisano et al. | 426/104 |
| 5,008,125 | 4/1991 | Cale et al. | 426/594 |
| 5,141,739 | 8/1992 | Jung et al. | 424/9.43 |
| 5,284,646 | 2/1994 | Menz et al. | 424/9.322 |
| 5,336,506 | 8/1994 | Josephson et al. | 424/488 |
| 5,342,607 | 8/1994 | Josephson | 424/9.45 |

OTHER PUBLICATIONS

Webster's Ninth New Collegiate Dictionary, 1983, p. 834.

Abdel–Akher, M. et al., "Structure of an arabinogalactan from *Colacasia esculenta*", *Chemical Abstracts*, 79 (1973) 146764c.

Antonova, G.F. et al., "Structure of an arabinogalactan from Siberian larch (*Larix sibirica Ledeb.*) wood", *Chemical Abstracts*, 102 (1985) 185387x.

Aspinall, G.O. et al., "Arabinogalactan A from Japanese Larch (*Larix leptolepis*)", *J. Chem. Soc.*, (1968), 2174–2179.

Beuth, J. et al., "Inhibition of liver metastasis in mice by blocking hepatocyte lectins with arabinogalactan infusions and D–galactose", *J. Cancer Res. Clin. Oncol.*, 113 (1987) 51–55.

Beuth, J. et al., "Inhibition of liver tumor cell colonization in two animal tumor models by lectin blocking with D–galactose or arabinogalactan", *Clin. Exper. Metastasis*, 6 (1988) 115–120.

Brillouet, J–M. et al., "Isolation, Purification, and Characterization of an Arabinogalactan from a Red Wine", *American Journal of Enology and Viticulture*, 41 (1990) 29–36.

U.S. Ser. No. 07/384,981 Josephson et al. abandoned.

Chang, K. et al., Characterization of the Arabinogalactan from Tepary Bean (*Phaseolus Acutifolius Var. Latifolius*), *Dissertation Abstracts International*, 18 (1987) 608–B.

Daffe, M. et al., "Predominant Structural Features of the Cell Wall Arabinogalactan of *Mycobacterium tuberculosis* as Revealed through Characterization of Oligoglycosyl Alditol Fragments by Gas Chromatography/Mass Spectrometry and by $^1$H and $^{13}$C NMR Analyses", *J. Biological Chemistry*, 265 (1990) 6734–6743.

Draper, P. et al., "Peptidoglycan and Arabinogalactan of *Mycobacterium leprae*", *J. General Microbiology*, 133 (1987) 1187–1194.

El–Kader, S. et al., "Isolation and Characterization of Arabinogalactan from Lima Bean (*Phaseolus limensis*) Seed", *Annals of Agric. Sci., Moshtohor*, 21 (1984) 651–61.

Gruber, P. et al., "Isolation and analysis by the reductive–cleavage method of linkage positions and ring forms in the *Mycobacterium smegmatis* cell–wall arabinogalactan", *Carbohydrate Research*, 203 (1990) 79–90.

Hill, R. et al., "Use of arabinogalactan to obtain washed murine platelets free of contaminating plasma proteins and appropriate for studies of function, morphology, and thrombopoilesis", *J. Lab. Clin. Med.*, 111 (1988) 73–83.

Hori et al., "Structure of an Arabinogalactan of Extracellular Hydroxyproline–Rich Glycoprotein in Suspension–Cultured Tobacco Cells", *Phytochemistry*, 19 (1980) 1755–56.

(List continued on next page.)

*Primary Examiner*—John Kight
*Attorney, Agent, or Firm*—Patrea L. Pabst; Madeline I. Johnston

[57] ABSTRACT

The invention is a very highly refined arabinogalactan gum falling within the molecular weight range of 6,000–2,500,000 and having a tannic acid equivalent of less than about 0.5 mg/g. The preferred product will have a molecular weight within the range of 6,000–1,300,000 and tannic acid equivalent no higher than about 0.25. The product is nearly colorless and is tasteless and odorless, it is prepared by first making a crude water extract of a natural source such as larch wood. This extract is next refined by the addition of an active $M_gO$ to precipitate the bulk of the lignans and iron containing compounds. Following that it is processed through a membrane no larger than about 0.45 μm to remove any species having molecular weights in excess of about 2,500,000. The permeate may then be treated on successively smaller membranes down to about 6,000 daltons. The permeate through the 6,000 dalton membrane contains virtually all of the monomers, homopolymers, and other materials that would contribute to the osmolality of a resulting solution of the ultrarefined arabinogalactan. The product is especially useful for medical research involving cell separation by density gradient since its contribution to the osmolality of a solution is essentially zero.

OTHER PUBLICATIONS

Kawasuji, T. et al., "Stability of arabinogalactan of larch in powders and aqueous solutions", *Chem. Abstracts*, 114 (1991) 192380r.

Kawasuji, T. et al., "Effects of arabinogalactan of larch on the properties of lactose–corn starch granules and tablets", *Chem. Abstracts*, 114 (1991) 192475a.

Kiyohara, H. et al., "Studies on Polysaccaharides from *Angelica acutiloba*. V. Molecular Aggregation and Anti-Complementary Activity of Arabinogalactan from *Angelica acutiloba*", *J. Pharmacobio–Dynamics*, 9 (1986) 339–346.

Kiyohara, H. et al., "Unit Structure of the Anti–Complementary Arabinogalactan from *Angelica acutiloba* Kitagawa", *Carbohydrate Research*, 167 (1987) 221–237.

Kiyohara, H. et al., "Structure of an Anti–Complementary Arabinogalactan from the Root of *Angelica acutiloba* Kitagawa", *Carbohydrate Research*, 193 (1989) 173–192.

Kiyohara, H. et al., "Relationship Between Structure and Activity of an Anti–Complementary Arabinogalactan from the Roots of *Angelica acutiloba* Kitagawa", *Carbohydrate Research*, 193 (1989) 193–200.

Larm, O. et al., "Structural Studies on a Water–soluble Arabinogalactan Isolated from Rapeseed (*Brassica napus*)", *Acta Chem. Scand.*, B, 30 (1976) 627–630.

Luettig, B. et al., "Macrophage Activation by the Polysaccharide Arabinogalactan Isolated from Plant Cell Cultures of *Echinacea purpurea*", *J. National Cancer Institute*, 81, (1989) 669–675.

Lynch, R.S. et al., "Studies on Larch Arabinogalactan", *Svensk Papperstidning*, 71 (1968) 890–91.

Maekawa, E. et al., "Structure of an Arabinogalactan Isolated from Bamboo Shoot", *Agr. Biol. Chem.*, 38 (1974) 227–29.

McNeil, M. et al., "Evidence for the Nature of the Link between the Arabinogalactan and Peptidoglycan of Mycobacterial Cell Walls", *J. Biol. Chem.*, 265 (1990) 18200–18206.

Mikhailov, V. et al., "Characteristics of arabinogalactan carbaminoethyl esters synthesis", *Chem. Abstracts*, 107 (1987) 134581b.

Neukom, H. et al., "Isolation and characterization of an arabinogalactan from wheat flour", *Carbohydrate Research*, 39 (1975) 387–89.

Ohtani, K. et al., "Sanchinana–A, a Reticuloendothelial System Activating Arabinogalactanfrom Sanchi–Ginseng (Roots of *Panax notoginseng*)", *Planta Medica*, 53 (1987) 166–69.

Sathe, S. et al., "Isolation and Partial Characterization of an Arabinogalactan from the Great Northern Bean (*Phaseolus vulgaris L*)", *J. Food Science*, 46 (1981) 1276–77.

Siddiqui, I., "Studies on Vegetables, Investigation of Water, Oxalate, and Sodium Hydroxide Soluble Celery (*Apium graveolens*) Polysaccharides: Celery Arabinogalactan", *J. Agric. and Food Chem.*, 38 (1990) 38–41.

Siddiqui, I. et al., "Structural Investigation of Water–Soluble Rapeseed (*Brassica campestris*)Polysaccharides", *Carbohydrate Research*, 24 (1972) 1–9.

Susheelamma, M. et al., "Isolation and Characterization of Arabinogalactan from Black Gram (*Phaseolus mungo*)", *J. Agri. Food Chem.*, 26 (1978) 1434–37.

Susheelamma, M. et al., "Functional Role of the Arabinogalactan of Black Gram (*Phaseolus mungo*) in the Texture of Leavened Foods (Steamed Puddings)", *J. Food Science*, 44 (1979) 1309–1312.

Uhlenbruck, G. et al., "Prevention of Experimental Liver Metastases by arabinogalactan", *Naturwissenschaften* 73 (1986) 626–27.

Van Wauwe, J. et al., "Arabinogalactan– and dextran–induced ear inflammation in mice: Differentail inhibition by $H_1$–antihistamines, 5–HT–serotonin antagonists and lipoxygenase blockers", *Agents and Actions*, 28 (1989) 78–82.

Wagner, H. et al., "Immunologically Active Polysaccharides of *Echinacea purpurea* Cell Cultures", *Phytochemistry*, 27 (1988) 119–126.

Wilson, E., "Solution Properties of Arabinogalactans studied by High Performance Gel Permeation Chromatography and Dynamic Light Scattering", *Abstracts of Papers from Second Chemical Congress of the North American Continent*, Abstract 61 (1980).

Wirth, P., "Arabinogalactan Sulfonates of Nitrogen–containing organic bases", *Chem. Abstracts*, 76 (1972) 46462z.

Yamada, H. et al., "Structural Characterisation of an Anti–Complementary Arabinogalactan from the Roots of *Angelica acutiloba* Kitagawa", *Carbohydrate Research*, 159 (1987) 275–291.

Yamada, H. et al., "Studies on Polysaccharides from *Angelica acutiloba*–IV. Characterization of an Anti–Complementary Arabinogalactan from the Roots of *Angelica acutiloba* Kitagawa", *Molecular Immunology*, 22 (1985) 295–304.

Adams, G. A., "Structure of an Arabinogalactan From Tamarack," *Can. J. Chem.*, 38:280–293 (1960).

Aspinall et al., "The Constitution of Larch E–Galactan" *J. Chem. Soc.*, 593–601 (1958).

Bouveng, et al., "Studies on Arabinogalactans", *Acta Chem. Scand.*, 12:1977–1984 (1958).

Ekman, K. H. "Decolorizing Studies on Arabinogalactan from *Larix occidentalis* Nutt"*Tappi*, 44:762–765 (1961).

Lystad–Borgin, G., "Molecular Properties of Water Soluble Polysaccharides from Western Larch" *J. Am. Chem. Soc.*, 71:2247–2248 (1949).

Mosimann et al., "Sedimentations– and Diffusionsmessungen am wasserloslichen Polysaccharid aus Larchenholz," *Kolloid–Z*, 100:99–105 (1942).

Stephen, A. M., in "The Polysaccharides" G.O. Aspinall, Ed., Academic Press, New York, NY, 1983, vol. 2, pp. 130–155.

Timell, "Wood Hemicelluloses, Part II," in *Advanced in Carbohydrate Chemistry*, Wolfrom, M.L., Ed., Academic Press, New York, 1965, pp. 408–481.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7–10 and 11 is confirmed.

Claims 1–6 are determined to be patentable as amended.

New claim 12 is added and determined to be patentable.

1. A highly refined arabinogalactan [polymer] *derived from a tree of the Larix genus, the arabinogalactan* having a molecular weight *distribution* within the range of *between* about 6,000 to 2,500,000 and a tannic acid equivalent no greater than about 0.5 mg/g, said [polymer] *arabinogalactan* further having the property of making negligible contribution to solution osmolality in solutions as high as 50% concentration by weight.

2. The [product] *arabinogalactan* of claim 1 in which the molecular weight falls within the range of *between* about 6,000 to 1,300,000 and the tannic acid equivalent is no greater than about 0.25 mg/g.

3. The [product] *arabinogalactan* of claim [2] *1* in which the molecular weight falls within the range of *between* about 20,000 to 1,500,000.

4. A highly refined arabinogalactan [polymer] *derived from a tree of the Larix genus, the arabinogalactan* having a molecular weight *distribution in a* range such that it will completely pass through a 0.45 µm ultrafiltration membrane and be wholly retained on a 6,000 dalton membrane, said [polymer] *arabinogalactan* having a tannic acid equivalent no greater than about 0.5 mg/g, *and said arabinogalactan further having the property of making negligible contribution to solution osmolality in solutions as high as 50% concentration by weight.*

5. The [polymer] *arabinogalactan* of claim 4 which will entirely pass through a membrane having a pore diameter of about 0.2 µm.

6. The [polymer] *arabinogalactan* of claim 4 which will completely pass through a membrane having a pore diameter of about 0.1 µm and which has a tannic acid equivalent no greater than about 0.25 mg/g.

*12. The arabinogalactan of claim 1 or 4 derived from Larix occidentalis.*

\* \* \* \* \*